US011901135B2

(12) United States Patent
Takahashi et al.

(10) Patent No.: US 11,901,135 B2
(45) Date of Patent: Feb. 13, 2024

(54) WIRELESS SWITCH

(71) Applicant: OMRON Corporation, Kyoto (JP)

(72) Inventors: Manabu Takahashi, Kyoto (JP); Kazuyuki Tsukimori, Kyoto (JP); Kouhei Yoshida, Kyoto (JP); Masao Nagase, Kyoto (JP); Yukio Yoshibashi, Kyoto (JP); Masahiro Ono, Kyoto (JP); Masato Matoba, Kyoto (JP); Tomofumi Kurashige, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 67 days.

(21) Appl. No.: 17/436,368

(22) PCT Filed: Feb. 19, 2020

(86) PCT No.: PCT/JP2020/006566

§ 371 (c)(1),
(2) Date: Sep. 3, 2021

(87) PCT Pub. No.: WO2020/184111

PCT Pub. Date: Sep. 17, 2020

(65) Prior Publication Data

US 2022/0157539 A1 May 19, 2022

(30) Foreign Application Priority Data

Mar. 14, 2019 (JP) ................................ 2019-047445

(51) Int. Cl.

*H01H 13/14* (2006.01)
*G08C 17/02* (2006.01)

(Continued)

(52) U.S. Cl.

CPC ............. *H01H 13/14* (2013.01); *G08C 17/02* (2013.01); *H01H 9/0271* (2013.01); *H01H 13/04* (2013.01); *H01H 13/20* (2013.01)

(58) Field of Classification Search

CPC ...... H01H 13/14; H01H 9/0271; H01H 13/04; H01H 13/20; H01H 2231/032;

(Continued)

(56) References Cited

U.S. PATENT DOCUMENTS

| | | | | |
|---|---|---|---|---|
| 6,787,721 B1 * | 9/2004 | Huang | .................... | H01H 3/20<br>200/43.11 |
| 8,283,584 B2 * | 10/2012 | Wang | .................... | H01H 13/14<br>200/43.18 |

(Continued)

FOREIGN PATENT DOCUMENTS

| | | |
|---|---|---|
| EP | 1014406 A1 | 6/2000 |
| EP | 3319101 A1 | 5/2018 |

(Continued)

OTHER PUBLICATIONS

International Search Report for International Application No. PCT/JP2020/006566; dated Apr. 14, 2020.

(Continued)

*Primary Examiner* — Lheiren Mae A Caroc
(74) *Attorney, Agent, or Firm* — CANTOR COLBURN LLP

(57) ABSTRACT

A wireless switch includes a switch body, a push button connected to the switch body in a state of being movable along an approaching/separating direction between a non-operating position and an operating position, a signal output device accommodated in the switch body and configured to output a switch signal in response to a movement of the push button from the non-operating position to the operating position, and a restriction member that restricts the move- (Continued)

ment of the push button from the non-operating position to the operation position when the push button is located at the non-operating position.

2 Claims, 7 Drawing Sheets

(51) Int. Cl.
*H01H 9/02* (2006.01)
*H01H 13/04* (2006.01)
*H01H 13/20* (2006.01)

(58) Field of Classification Search
CPC ......... H01H 2235/01; H01H 2239/076; H01H 13/02; H01H 9/20; H01H 9/02; G08C 17/02
USPC ......... 200/43.01, 43.11, 43.13, 43.16, 43.18, 200/43.19, 43.21

See application file for complete search history.

(56) References Cited

U.S. PATENT DOCUMENTS

| | | | | |
|---|---|---|---|---|
| 8,305,241 | B2 * | 11/2012 | Wang .................... | G06F 3/0202<br>200/43.11 |
| 2014/0345409 | A1 | 11/2014 | Watanabe | |
| 2018/0158626 | A1 | 6/2018 | Maruma et al. | |

FOREIGN PATENT DOCUMENTS

| | | | |
|---|---|---|---|
| JP | S53130480 | U | 10/1978 |
| JP | H0615230 | A | 2/1994 |
| JP | 4733259 | B2 | 7/2011 |
| JP | 2018093683 | A | 6/2018 |
| KR | 1020170028503 | A | 3/2017 |

OTHER PUBLICATIONS

Written Opinion of the International Searching Authority for International Application No. PCT/JP2020/006566; dated Apr. 14, 2020.
JPO Notice of Reasons for Refusal for corresponding JP Application No. 2019-047445; dated Dec. 7, 2021.
EPO Extended European Search Report for corresponding EP Application No. 20770065.9; dated Oct. 24, 2022.

* cited by examiner

WIRELESS SWITCH

CROSS REFERENCE TO RELATED APPLICATIONS

This is the U.S. national stage of application No. PCT/JP2020/006566, filed on Feb. 19, 2020. Priority under 35 U.S.C. § 119(a) and 35 U.S.C. § 365(b) is claimed from Japanese Application No. 2019-047445 filed Mar. 14, 2019, the disclosure of which is also incorporated herein by reference.

TECHNICAL FIELD

The present disclosure relates to a wireless switch.

BACKGROUND ART

PTL 1 discloses a wireless switch including a button for operating a load apparatus.

CITATION LIST

Patent Literature

PTL 1: JP 4733259 B2

SUMMARY OF INVENTION

Technical Problem

A wireless switch of the type disclosed in PTL 1 may include a push button as a button of the wireless switch. With regard to a wireless switch of this type, when, for example, the wireless switch is dropped from a higher position or the wireless switch is transported, the push button may be wrongly operated.

An object of the present disclosure is to provide a wireless switch configured to prevent a wrong operation.

Solution to Problem

A wireless switch according to an example of the present disclosure includes:

- a switch body;
- a push button connected to the switch body in a state of being movable along an approaching/separating direction that the push button is closer to and away from the switch body, between a non-operating position away from the switch body and an operating position closer to the switch body than the non-operating position;
- a signal output device accommodated in the switch body and configured to output a switch signal in response to a movement of the push button from the non-operating position to the operating position; and
- a restriction member that restricts the movement of the push button from the non-operating position to the operating position when the push button is located at the non-operating position.

Advantageous Effects of Invention

A wireless switch according to an example of the present disclosure includes a restriction member configured to restrict a movement of the push button from the non-operating position to an operating position when a push button is located at a non-operating position. With this configuration, for example, even when the wireless switch is dropped from a higher position or the wireless switch is transported, it is possible to prevent the push button from being wrongly operated. Accordingly, it is possible to realize the wireless switch 1 capable of preventing the wrong operation.

DESCRIPTION OF EMBODIMENTS

An example of the present disclosure will be described below with reference to the appended drawings. Note that, in descriptions below, a term indicating a specific direction or position (such as "top", "bottom", "right," or "left") is used as needed, but these terms are merely intended for ease of understanding of the present disclosure with reference to the drawings, and thus do not limit the technical scope of the present disclosure. Additionally, the descriptions below are merely illustrative, and are not intended to limit the present disclosure and any application thereof or any use thereof. Still additionally, the drawings are schematic, and proportions of dimensions or the like do not necessarily match actual ones.

Figure 1:
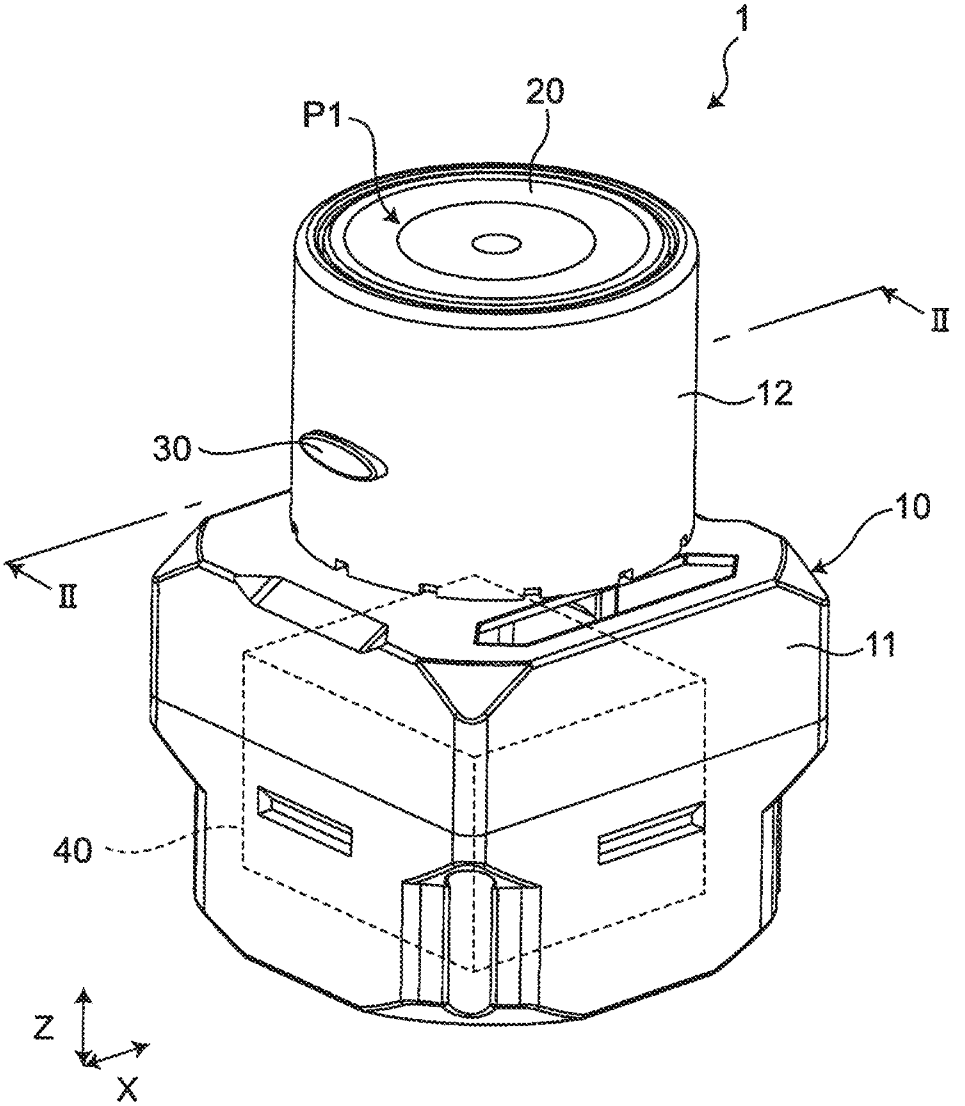
FIG. 1 is a perspective view illustrating a wireless switch according to an embodiment of the present disclosure.

As illustrated in FIG. 1, a wireless switch 1 according to an embodiment of the present disclosure includes a housing 10, a push button 20, and a restriction member 30. The push button 20 is movable along an approaching/separating direction Z that is closer to and away from the housing 10. The restriction member 30 is configured to be capable of restricting a movement of the push button 20 in the approaching/separating direction Z.

Figure 2:
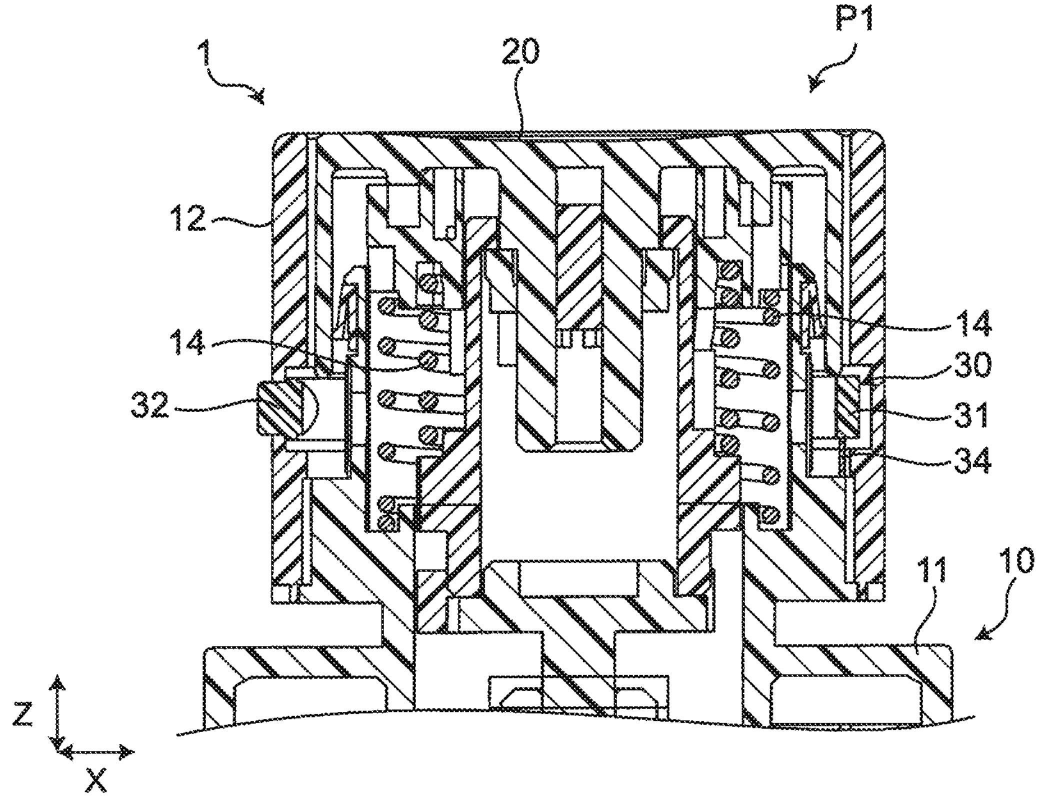
FIG. 2 is a sectional view taken along line II-II in FIG. 1.
Figure 3:
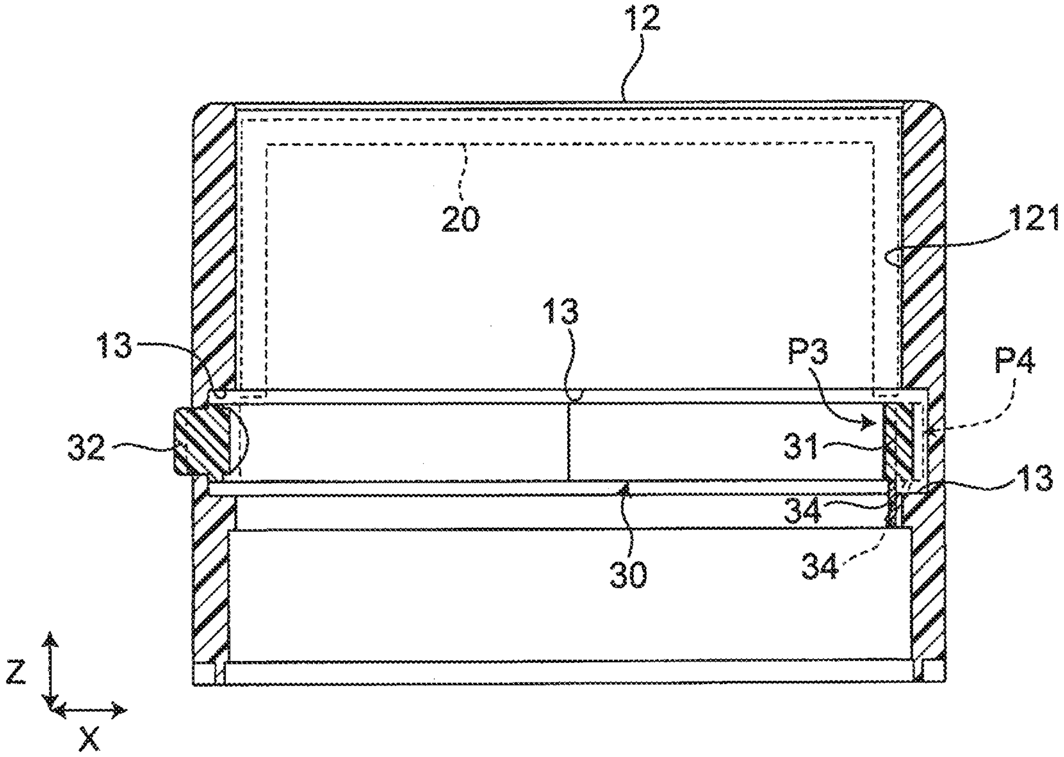
FIG. 3 is a sectional view taken along line II-II in FIG. 1, illustrating a cover member and a restriction member of the wireless switch in FIG. 1.

As an example, the housing 10 is composed of an insulating resin. As illustrated in FIG. 1, the housing 10 includes a switch body 11 having a substantially cuboid box shape, and a cover member 12 having a substantially cylindrical shape and surrounding around the push button 20 in the approaching/separating direction Z. The switch body 11 accommodates therein a signal output device 40 configured to output a switch signal to outside of the wireless switch 1 in response to the movement of the push button 20. In other words, the wireless switch 1 is operated so that the switch signal is outputted to the outside. As illustrated in FIG. 2, the cover member 12 accommodates therein the restriction member in a state of being movable along an operating direction X intersecting (e.g., orthogonal to) the approaching/separating direction Z but not movable in the approaching/separating direction Z. Specifically, as illustrated in FIG. 3, the cover member 12 includes, on its inner surface 121, a guide unit 13 opposing the push button 20. The guide unit 13 is configured as a groove to accommodate a main body unit 31 of the restriction member 30 as will be described later, and is configured to guide a movement of the main body unit 31 in the operating direction X.

Figure 4:
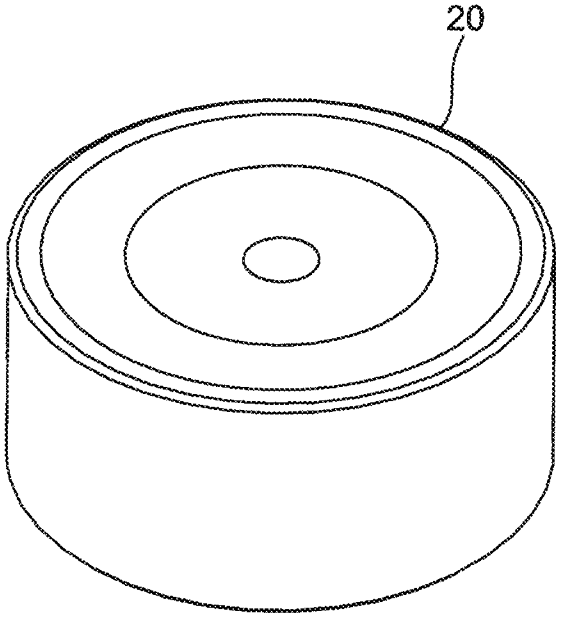
FIG. 4 is a perspective view illustrating a push button of the wireless switch in FIG. 1.
Figure 7:
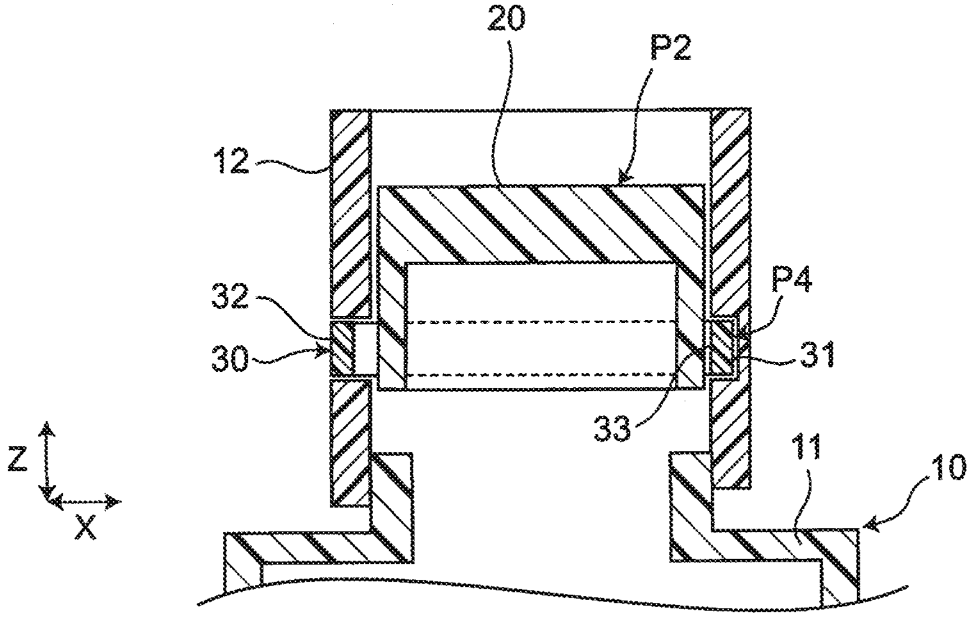
FIG. 7 is a second schematic sectional diagram of describing each of the restriction position and the release position of the restriction member of the wireless switch in FIG. 1.

As an example, the push button 20 is composed of an insulating resin. As illustrated in FIG. 4, the push button 20 has a substantially cylindrical shape with one end open in the approaching/separating direction Z, and is disposed to have an open surface opposing the switch body 11. The push button 20 is connected to the switch body 11 in a state of being movable in the approaching/separating direction Z, between a non-operating position P1 that is away from the switch body 11 and an operating position P2 that is closer to the switch body 11 than the non-operating position P1 (as illustrated in FIG. 7). The push button 20 is caused to move from the non-operating position P1 to the operating position P2, so that the switch signal is outputted from the signal output device 40. The switch body 11 accommodates therein a coil spring 14. The push button 20 is biased by the coil spring 14 in the approaching/separating direction Z to be away from switch body 11, and is located at the non-operating position P1 in an initial state where no external force is applied.

The non-operating position P1 may be, in the approaching/separating direction Z, any position of the push button 20 that is located farther from the switch body 11 than at the operating position P2. The operating position P2 may be, in the approaching/separating direction Z, any position of the push button 20 that is located closer to the switch body 11 than at the non-operating position P1. In the wireless switch 1, as an example, the non-operating position P1 and the operating position P2 are respectively set to correspond ends of a movement range of the push button 20 in the approaching/separating direction Z.

Figure 5:
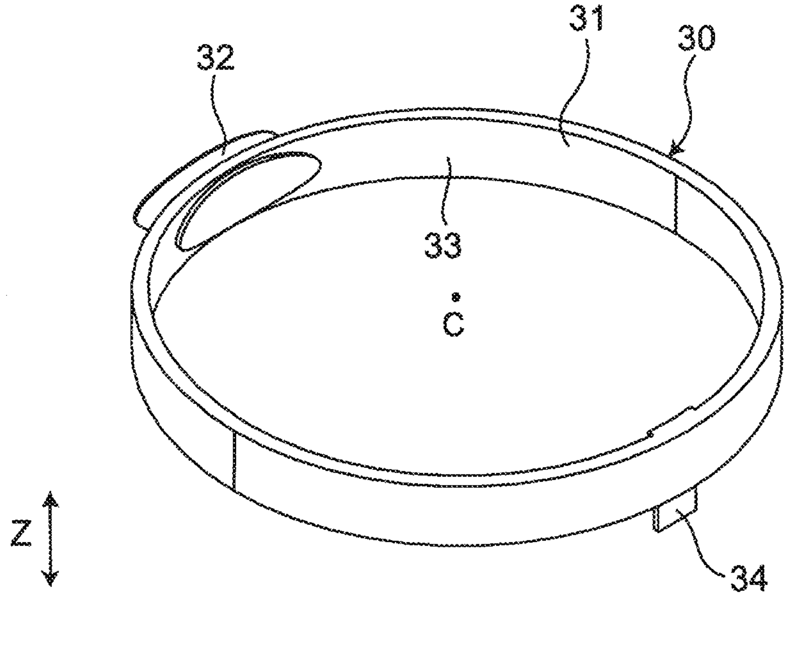
FIG. 5 is a perspective view illustrating the restriction member of the wireless switch in FIG. 1.

As an example, the restriction member 30 is composed of an insulating resin, and has a substantially annular plate shape as illustrated in FIG. 5. The restriction member 30 is configured to restrict the movement of push button 20 from the non-operating position P1 to the operating position P2 when the push button 20 is located at the non-operating position P1.

Specifically, the restriction member 30 includes the main body unit 31 having a substantially annular plate shape, and an operation unit 32 in the main body unit 31.

Figure 6:
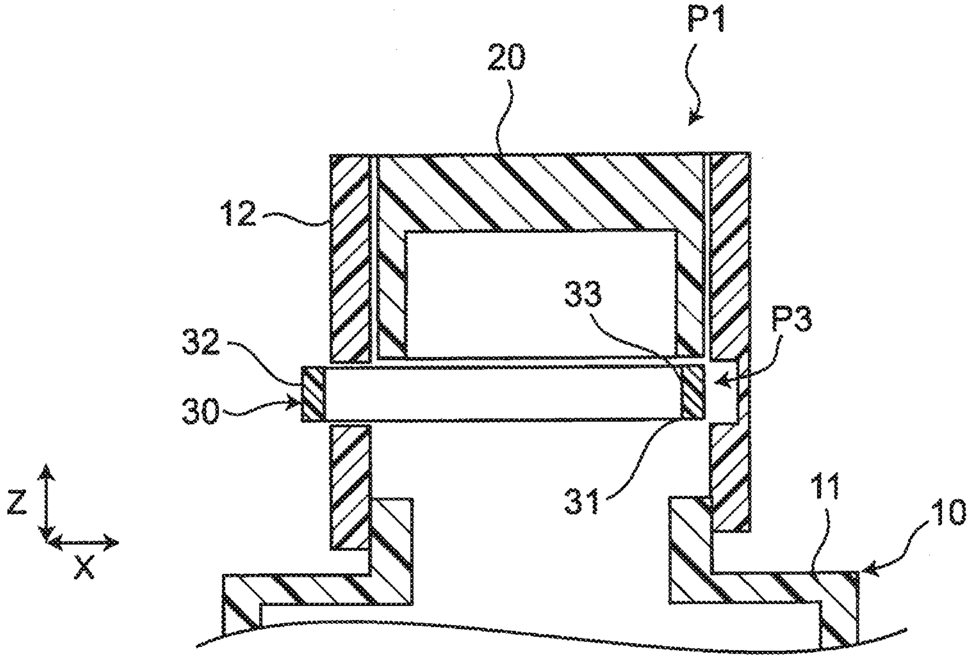
FIG. 6 is a first schematic sectional diagram of describing each of a restriction position and a release position of the restriction member of the wireless switch in FIG. 1.

As illustrated in FIG. 3, the main body unit 31 is accommodated in the guide unit 13 of the cover member 12, and extends in the operating direction X along the inner surface 121 of the cover member 12. As illustrated in FIGS. 6 and 7, the main body unit 31 is disposed to be movable along the operating direction X, between a restriction position P3 and a release position P4.

As illustrated in FIG. 6, the restriction position P3 corresponds, when the push button 20 is located at the non-operating position P1, to a position of the main body unit 31 that the main body unit 31 is disposed between the switch body 11 and a peripheral edge of the open surface of the push button 20 in the approaching/separating direction Z and a restriction on the movement of the push button 20 from the non-operating position P1 to the operating position P2 is imposed. As illustrated in FIG. 7, the release position P4 corresponds to a position of the main body unit 31 that the restriction on the movement of push button 20 from the non-operating position P1 to the operating position P2 is released. When the main body unit 31 is located at the release position P4, the push button 20 moves from the non-operating position P1 to the operating position P2 through a hole 33 inside the main body unit 31.

The restriction position P3 may be any position of the main body unit 31 that is configured to impose the restriction on the movement of the push button 20 from the non-operating position P1 to the operating position P2. The release position P4 may be any position of the main body unit 31 that is configured to release the restriction of the movement of the push button 20 from the non-operating position P1 to the operating position P2. In the wireless switch 1, as an example, the restriction position P3 and the release position P4 are respectively set to correspond to ends of a movement range of the main body unit 31 in the operating direction X.

As illustrated in FIG. 2, the operation unit 32 protrudes radially outward from the main body unit 31 to be located at an outer side of the cover member 12. When external force is applied to the operation unit 32 along the operating direction X from the outer side of the cover member 12 toward an inner side of the cover member 12, the main body unit 31 is caused to move from the restriction position P3 to the release position P4. In other words, the operation unit 32 is configured to be capable of causing a movement of the main body unit 31 from the restriction position P3 to the release position P4 by a movement of the operation unit 32 in the operating direction X.

As illustrated in FIG. 2, the restriction member 30 includes a biasing member 34 that biases the main body unit 31 from the release position P4 toward the restriction position P3. As an example, the biasing member 34 is configured by a leaf spring. As illustrated in FIG. 5, the biasing member 34 is disposed opposite the operation unit 32 with respect to a center C of the main body unit 31 when viewed in the approaching/separating direction Z. As illustrated in FIGS. 2 and 3, the biasing member 34 extends from the main body unit 31 in the approaching/separating direction Z to be closer to the switch body 11. When the main body unit 31 moves from the restriction position P3 to the release position P4, the biasing member 34 is brought into contact with the inner surface 121 of the cover member 12 (see FIG. 3), and is elastically deformed in the operating direction X to be closer to the operation unit 32. With this configuration, the main body unit 31 is biased from the release position P4 toward the restriction position P3. In view of this, in the wireless switch 1 of this embodiment, the operation unit 32 of the restriction member 30 is caused to move toward the inner side of the cover member 12, so that the main body unit 31 is caused to move to the release position P4 against the biasing force of the biasing member 34. Then, with the main body unit 31 held at the release position P4, the push button 20 is caused to move toward the switch body 11, so that the switch signal is outputted.

The signal output device 40 includes, as an example, a power generation module, an RF module, and an antenna. The power generation module generates electric power in response to the movement of the push button 20 from the non-operating position P1 to the operating position P2, and supplies the electric power to the RF module. When the electric power is supplied from the power generation module, the RF module outputs the switch signal to the outside of wireless switch 1 via the antenna.

The wireless switch 1 includes the restriction member 30 that restricts the movement of the push button 20 from the non-operating position P1 to the operating position P2 when the push button 20 is located at the non-operating position P1. With this configuration, for example, even when the wireless switch 1 is dropped from a higher position or the wireless switch 1 is transported, it is possible to prevent the push button 20 from being wrongly operated. Accordingly, it is possible to realize the wireless switch 1 capable of preventing a wrong operation.

The restriction member 30 is configured to be movable between the restriction position P3 and the release position P4 along the operating direction X intersecting the approaching/separating direction Z when the push button 20 is located at the non-operating position P1. The restriction position P3 is a position that the restriction member 30 is disposed between the switch body 11 and the push button 20 in the approaching/separating direction Z and the restriction on the movement of the push button 20 from the non-operating position P1 to the operating position P2 is imposed. The release position P4 is a position that the restriction on the movement of the push button 20 from the non-operating position P1 to the operating position P2 is released. With this configuration, it is easily possible to realize the wireless switch 1 capable of preventing the wrong operation.

The restriction member 30 includes the main body unit 31 and the operation unit 32. The main body unit 31 is disposed to be movable along the operating direction X between the restriction position P3 and the release position P4. The operation unit 32 is connected to the main body unit 31 and is configured to be capable of moving the main body unit 31 from the restriction position P3 to the release position P4 by a movement of operation unit 32 in the operating direction X. With this configuration, it is easily possible to realize the wireless switch 1 capable of preventing the wrong operation.

The wireless switch 1 further includes the cover member 12 surrounding the push button 20 in the approaching/separating direction Z. In the wireless switch 1, the main body unit 31 of the restriction member 30 extends along the inner surface of the cover member 12, the inner surface opposing the push button 20. Further, the cover member 12 includes the guide unit 13 on the inner surface 121 opposing the push button 20, the guide unit 13 configured as the groove to accommodate the main body unit 31 and guide the movement of the main body unit 31 in the operating direction X. With this configuration, the main body unit 31 of the restriction member 30 can move in the operating direction X more reliably. Accordingly, it is easily possible to realize the wireless switch 1 capable of preventing the wrong operation more reliably.

The wireless switch 1 further includes the biasing member 34 that biases the main body unit 31 of the restriction member 30 from the release position P4 toward the restriction position P3. With this configuration, it is possible to more reliably prevent the wireless switch 1 from being transported in a state where the main body unit 31 remains at the release position P4. Accordingly, it is easily possible to realize the wireless switch 1 capable of preventing the wrong operation more reliably.

Figure 8:
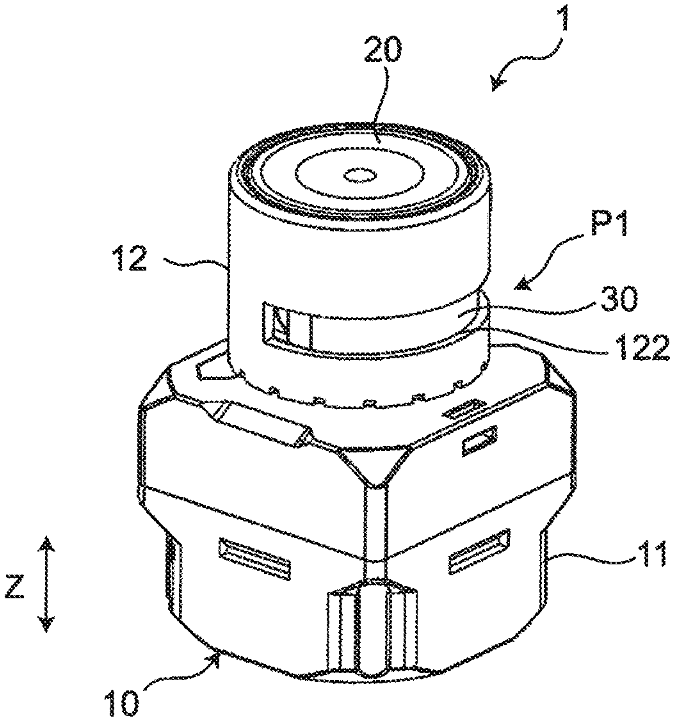
FIG. 8 is a first perspective view illustrating a first modification of the wireless switch in FIG. 1.
Figure 9:
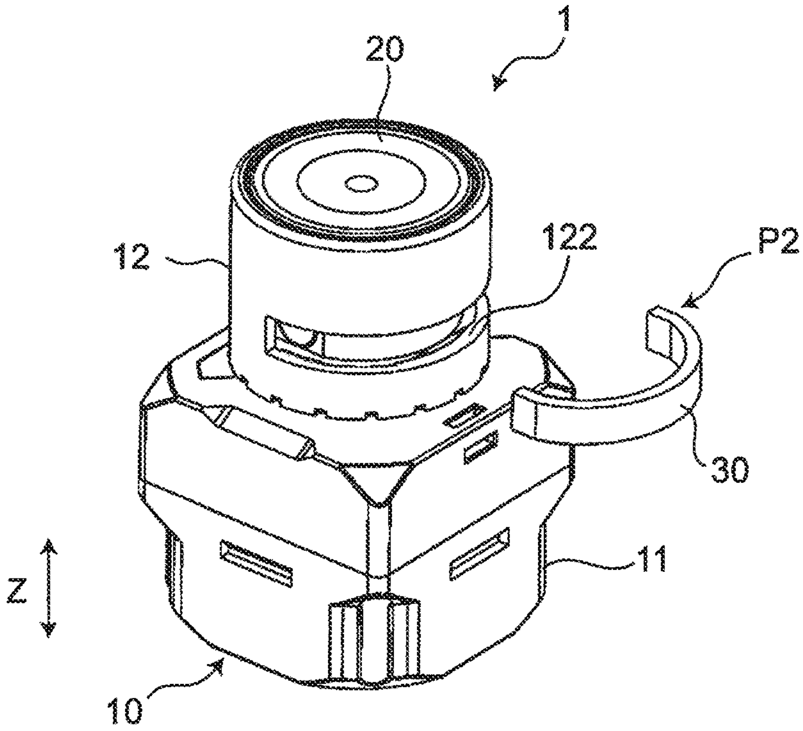
FIG. 9 is a second perspective view illustrating the first modification of the wireless switch in FIG. 1.

As long as the restriction member 30 is configured to restrict the movement of the push button 20 from the non-operating position P1 to the operating position P2 when the push button 20 is located at the non-operating position P1, the present disclosure is not limited to a case where the restriction member 30 includes the main body unit 31 of the annular plate shape and the operation unit 32. For example, as illustrated in FIGS. 8 and 9, the restriction member 30 may be configured by a plate member having a semicircular arc shape. In the wireless switch 1 of FIGS. 8 and 9, the cover member 12 includes a through hole 122 that penetrates the cover member 12 in a plate thickness direction of the cover member 12. The through hole 122 extends in a circumferential direction of the cover member 12 and is configured to accommodate the restriction member 30. When the push button 20 is located at the non-operating position P1, the restriction member 30 is accommodated in the through hole 122 to be disposed between the push button 20 and the switch body 11. Thus, the movement of the push button 20 in the approaching/separating direction Z is restricted.

Figure 10:
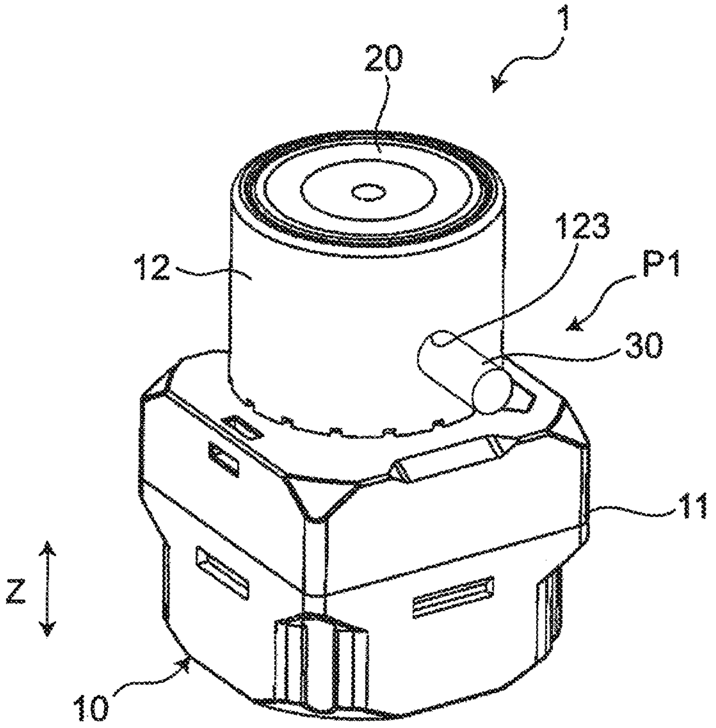
FIG. 10 is a first perspective view illustrating a second modification of the wireless switch in FIG. 1.
Figure 11:
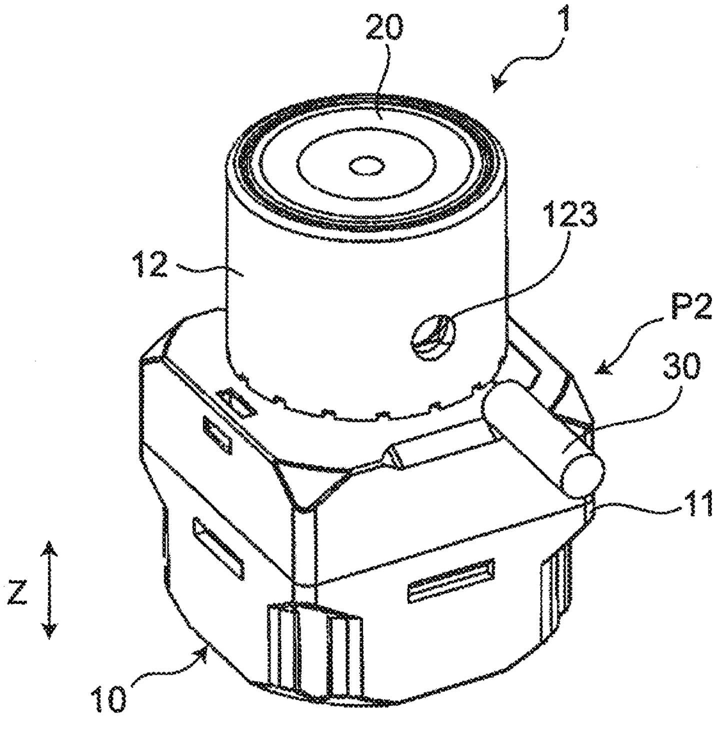
FIG. 11 is a second perspective view illustrating the second modification of the wireless switch in FIG. 1.

For example, as illustrated in FIGS. 10 and 11, the restriction member 30 may be configured by a cylindrical member. In the wireless switch 1 of FIGS. 10 and 11, the cover member 12 includes a through hole 123 having a substantially circular shape. The through hole 123 penetrates the cover member 12 in the plate thickness direction of the cover member 12. The restriction member 30 can be inserted into the through hole 123 in a cylindrical axial direction of the restriction member 30. When the push button 20 is located at the non-operating position P1, the restriction member 30 is inserted into the through hole 123, so that one end of the restriction member 30 in the cylindrical axial direction is disposed between the push button 20 and the switch body 11. Thus, the movement of the push button 20 in the approaching/separating direction Z is restricted.

Figure 12:
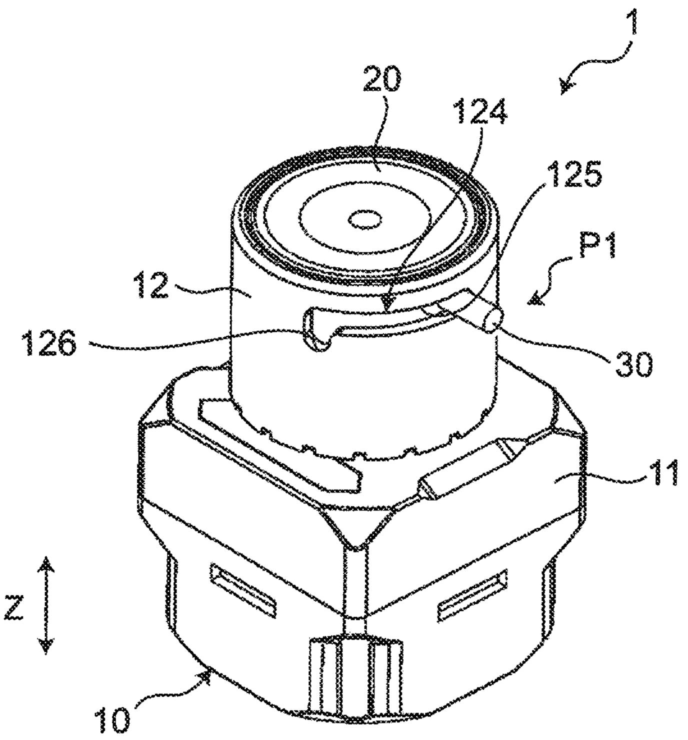
FIG. 12 is a first perspective view illustrating a third modification of the wireless switch in FIG. 1.
Figure 13:
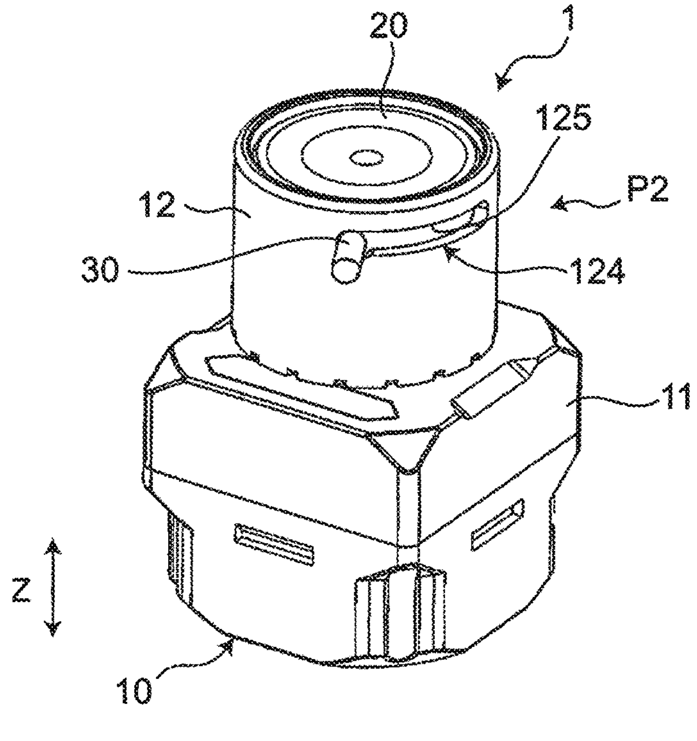
FIG. 13 is a second perspective view illustrating the third modification of the wireless switch in FIG. 1.

For example, as illustrated in FIGS. 12 and 13, the restriction member 30 may be configured by a member having a substantially cylindrical shape, and may be formed integrally with the push button 20. In the wireless switch 1 of FIGS. 12 and 13, the cover member 12 includes a through hole 124 capable of accommodating the restriction member 30. The through hole 124 penetrates the cover member 12 in the plate thickness direction of the cover member 12. The through hole 124 is configured by a lateral groove 125 and a longitudinal groove 126. The lateral groove 125 extends in a circumferential direction of the cover member 12. The longitudinal groove 126 extends from one end of the cover member 12 in the circumferential direction of the cover member 12 and extends in the approaching/separating direction Z to be closer to the switch body 11. The lateral groove 125 is configured to restrict a movement of the restriction member 30 in the approaching/separating direction Z, while allowing a movement of the restriction member 30 in the circumferential direction of the cover member 12 (i.e., the operating direction Y). Concurrently, the longitudinal groove 126 is configured to restrict the movement of the restriction member 30 in the circumferential direction of the cover member 12, while allowing the movement of the restriction member 30 in the approaching/separating direction Z. The restriction member 30 is disposed to be accommodated in the lateral groove 125 in a state where the push button 20 is located at the non-operating position P1.

The cover member 12 may be omitted.

The biasing member 34 may adopt any configuration capable of biasing the main body unit 31 of the restriction member 30 from the release position P4 toward the restriction position P3. For example, the biasing member 34 is not limited to the leaf spring, and may be other elastic member; and the biasing member 34 is not limited to a case of being disposed in the restriction member 30, and may be disposed in the cover member 12. The restriction member 30 is not limited to be disposed opposite the operation unit 32 with respect to the center C of the main body unit 31 when viewed in the approaching/separating direction Z, and may be disposed at any position of the main body unit 31.

The signal output device 40 is not limited to the case of including the power generation module, the RF module, and the antenna, and may adopt any configuration to output the switch signal in response to the movement of the push button 20.

Various embodiments of the present disclosure have been described above in detail with reference to the drawings. Finally, various aspects of the present disclosure will be described. Note that, in descriptions below, as an example, each constituent element is denoted with a reference sign.

A wireless switch 1 according to a first aspect of the present disclosure includes:

a switch body 11;

a push button 20 connected to the switch body 11 in a state of being movable along an approaching/separating direction Z that the push button 20 is closer to and away from the switch body 11, between a non-operating position P1 away from the switch body 11 and an operating position P2 closer to the switch body 11 than the non-operating position P1;

a signal output device 40 accommodated in the switch body 11 and configured to output a switch signal in response to a movement of the push button 20 from the non-operating position P1 to the operating position P2; and a restriction member 30 configured, when the push button 20 is located at the non-operating position P1, to restrict the movement of the push button 20 in the approaching/separating direction Z and hold the push button 20 at the non-operating position P1.

The wireless switch 1 according to the first aspect includes the restriction member 30 that restricts the movement of the push button 20 from the non-operating position P1 to the operating position P2 when the push button 20 is located at the non-operating position P1. With this configuration, for example, even when the wireless switch 1 is dropped from a higher position or the wireless switch 1 is transported, it is possible to prevent the push button 20 from being wrongly operated. Accordingly, it is possible to realize the wireless switch 1 capable of preventing a wrong operation.

In a wireless switch 1 according to a second aspect of the present disclosure, the restriction member 30 is configured to be movable between a restriction position P3 and a release position P4 along an operating direction X intersecting the approaching/separating direction Z when the push button 20 is located at the non-operating position P1, the restriction position P3 being a position that the restriction member 30 is disposed between the switch body 11 and the push button 20 in the approaching/separating direction Z and a restriction on the movement of the push button 20 from the non-operating position P1 to the operating position P2 is imposed, and the release position P4 is a position that the restriction is released.

With the wireless switch 1 according to the second aspect, it is easily possible to realize the wireless switch 1 capable of preventing the wrong operation.

In a wireless switch 1 according to a third aspect of the present disclosure, the restriction member 30 includes:

a main body unit 31 disposed to be movable along the operating direction X between the restriction position P3 and the release position P4; and an operation unit 32 connected to the main body unit 31, the operation unit 32 being capable of moving the main body unit 31 from the restriction position P3 to the release position P4 by a movement of operation unit 32 in the operating direction X.

With the wireless switch 1 according to the third aspect, it is easily possible to realize the wireless switch 1 capable of preventing the wrong operation.

A wireless switch 1 according to a fourth aspect of the present disclosure further includes:

a cover member 12 surrounding the push button 20 in the approaching/separating direction Z.

In the wireless switch 1, the main body unit 31 extends in the operating direction X along an inner surface 121 of the cover member 12, the inner surface 121 opposing the push button 20, and the cover member 12 includes a guide unit 13 on the inner surface opposing the push button 20, the guide unit 13 being configured as a groove to accommodate the main body unit 31 and guide the movement of the main body unit 31 in the operating direction X.

In the wireless switch 1 according to the fourth aspect, the main body unit 31 of the restriction member 30 can move in the operating direction X more reliably. Accordingly, it is easily possible to realize the wireless switch 1 capable of preventing the wrong operation more reliably.

A wireless switch 1 according to a fifth aspect of the present disclosure further includes:

a biasing member 34 configured to bias the main body unit 31 from the release position P4 toward the restriction position P3.

With the wireless switch 1 according to the fifth aspect, it is possible to more reliably prevent the wireless switch 1 from being transported in a state where the main body unit 31 remains at the release position P4. Accordingly, it is easily possible to realize the wireless switch 1 capable of preventing the wrong operation more reliably.

It should be noted that, among the foregoing embodiments and modifications, any combinations thereof may be appropriately made, and effects of these combinations are also encompassed within the technical scope of the present disclosure. Additionally, any combinations of the embodiments, any combinations of the examples, or any combinations of the embodiments and the examples, in addition to any combinations of the configurations of the different embodiments or the different examples, are encompassed within the technical scope of the present invention.

A preferred embodiment of the present disclosure has been described above with reference to the appended drawings; however, in addition to the foregoing descriptions, any changes or modifications thereof for those skilled in the art may be exhibited. It is to be understood that the present disclosure embraces all these changes or modifications within the meanings and scopes of the claims appended hereto.

INDUSTRIAL APPLICABILITY

A wireless switch of the present disclosure is applicable as, for example, a switch of a factory automation apparatus.

REFERENCE SIGNS LIST

1. wireless switch
10. housing

11. switch body
12. cover member
121. inner surface
122, 123, 124. through hole
125. lateral groove
126. longitudinal groove
13. guide unit
14. coil spring
20. push button
30. restriction member
31. main body unit
32. operation unit
33. hole
34. biasing member
40. signal output device
P1. non-operating position
P2. operating position
P3. restriction position
P4. release position

The invention claimed is:

1. A wireless switch, comprising:

a switch body;

a push button connected to the switch body in a state of being movable along an approaching/separating direction that the push button is closer to and away from the switch body, between a non-operating position away from the switch body and an operating position closer to the switch body than the non-operating position;

a signal output device accommodated in the switch body and configured to output a switch signal in response to a movement of the push button from the non-operating position to the operating position; and a restriction member that restricts the movement of the push button from the non-operating position to the operating position when the push button is located at the non-operating position, wherein the restriction member is configured to be movable between a restriction position and a release position along an operating direction intersecting the approaching/separating direction when the push button is located at the non-operating position, the restriction position being a position that the restriction member is disposed between the switch body and the push button in the approaching/separating direction and a restriction on the movement of the push button from the non-operating position to the operating position is imposed, and the release position being a position that the restriction is released, the restriction member includes:

a main body unit disposed to be movable along the operating direction between the restriction position and the release position; and an operation unit connected to the main body unit, the operation unit being capable of moving the main body unit from the restriction position to the release position by a movement of the operation unit in the operating direction, the wireless switch comprises a cover member surrounding the push button in the approaching/separating direction, the main body unit extends in the operating direction along an inner surface of the cover member, the inner surface opposing the push button, the cover member includes a guide unit on the inner surface opposing the push button, the guide unit being configured as a groove to accommodate the main body unit and guide the movement of the main body unit in the operating direction, the release position is arranged farther from the push button than the restriction position in the operating direction, and the guide unit is configured as a bottomed groove to accommodate the main body unit.

2. A wireless switch, comprising:

a switch body;

a push button connected to the switch body in a state of being movable along an approaching/separating direction that the push button is closer to and away from the switch body, between a non-operating position away from the switch body and an operating position closer to the switch body than the non-operating position;

a signal output device accommodated in the switch body and configured to output a switch signal in response to a movement of the push button from the non-operating position to the operating position; and a restriction member that restricts the movement of the push button from the non-operating position to the operating position when the push button is located at the non-operating position, wherein the restriction member is configured to be movable between a restriction position and a release position along an operating direction intersecting the approaching/separating direction when the push button is located at the non-operating position, the restriction position being a position that the restriction member is disposed between the switch body and the push button in the approaching/separating direction and a restriction on the movement of the push button from the non-operating position to the operating position is imposed, and the release position being a position that the restriction is released, the restriction member includes:

a main body unit disposed to be movable along the operating direction between the restriction position and the release position; and an operation unit connected to the main body unit, the operation unit being capable of moving the main body unit from the restriction position to the release position by a movement of the operation unit in the operating direction, the wireless switch comprises a cover member surrounding the push button in the approaching/separating direction, the main body unit extends in the operating direction along an inner surface of the cover member, the inner surface opposing the push button, the cover member includes a guide unit on the inner surface opposing the push button, the guide unit being configured as a groove to accommodate the main body unit and guide the movement of the main body unit in the operating direction, the wireless switch further comprises a biasing member that biases the main body unit from the release position toward the restriction position, the main body unit has substantially annular shape, and the biasing member is arranged on an opposite side of the operation unit with respect to a center of the restriction member when viewed from the approaching/separating direction.

* * * * *